United States Patent [19]
Ullmann et al.

[11] 3,930,028
[45] Dec. 30, 1975

[54] PROCESS FOR THE MICROBIOLOGICAL PURIFICATION OF DAIRY EFFLUENTS

[75] Inventors: Agnes Ullmann; Maxime Schwartz, both of Paris, France

[73] Assignee: Agence Nationale de Valorisation de la Recherche (ANVAR), Neuilly-sur-Seine, France

[22] Filed: June 4, 1973

[21] Appl. No.: 366,458

[30] Foreign Application Priority Data
June 8, 1972    France .............................. 72.20697

[52] U.S. Cl. ........................ 426/41; 426/43; 210/2; 71/9; 195/108
[51] Int. Cl.² .... A23C 5/00; C02C 1/02; A23J 1/20; A23K 1/08
[58] Field of Search .............. 195/2, 4, 108; 426/34, 426/41, 42, 43; 71/9; 210/2, 11, 15

[56]     References Cited
         UNITED STATES PATENTS
2,809,113   10/1957   Stimpson et al. ...................... 426/41
3,634,226   1/1972    Witt et al. .............................. 210/11

*Primary Examiner*—Lionel M. Shapiro
*Attorney, Agent, or Firm*—Anthony A. O'Brien

[57]     ABSTRACT

The invention relates to a process for the microbiological purification of dairy effluents.

The process comprises directly fermenting milk serum in particular with proteolytic bacterial strains of the Enterobacter or Serratia type belonging to the family of Enterobacteriaceae.

It is possible by this process to eliminate more than 80% of the dry solids from the milk serum under highly economical conditions.

7 Claims, No Drawings

3,930,028

PROCESS FOR THE MICROBIOLOGICAL PURIFICATION OF DAIRY EFFLUENTS

BACKGROUND OF INVENTION

Dairy effluents consist for the most part of whey or milk serum which is a liquid phase obtained after precipitation from the milk (by the addition of rennet or acid) of casein which is used in the manufacture of cheese.

The average composition of milk serum is as follows:

| | |
|---|---|
| water | 93.5% |
| lactose | 4.5% |
| nitrogenous materials | 0.9% |
| fats | 0.3% |
| minerals | 0.6% |
| lactic acid | 0.2% |

One of the principal constituents of the nitrogenous materials is the protein lactalbumin.

The logical outlet for dairy effluents is traditionally the nearest watercourse. However, disposal in this way results in changes in both the chemical and microbiological composition of the watercourse and promotes the development of microorganisms releasing acid or toxic products which cause ecologically unacceptable changes including the elimination of fish and modification of flora.

One method of eliminating milk serum is to use it either directly or after concentration or drying for feeding livestock. The direct use of milk serum necessitates the establishment of a livestock-breeding station (for example a pig farm) in the proximity of the dairy farm. On the other hand, it is only economical to concentrate on dry milk serum in cases where the quantity of milk serum to be treated exceeds about 1 million liters per day. In fact, most dairy farms do not produce sufficient quantities of milk serum (30,000 liters per day for an average dairy farm) to make it economical to install treatment installations and, for various reasons, cannot be run adjacent to pig farms.

Another method is to use the milk serum as a manure.

In most cases, however, direct disposal is still the most economical solution although it is the most dangerous so far as the environment is concerned.

Accordingly, a process for purification before disposal would be extremely desirable, more particularly a microbiological purification process which can be adapted to suit the type of milk serum to be treated.

The microbiological purification of dairy effluent has always encountered two problems, the solutions to which have never been considered economically viable. The first of these two problems relates to the extremely high concentration of lactose in whey.

It is known that it is impossible to aerate the culture mediums sufficiently to enable the rapid growth of bacteria when the concentration thereof exceeds 3 g in dry weight per litre. Now, with a lactose concentration of 45 g per litre, it would theoretically be possible to obtain at least 10 g in dry weight per litre of bacterial matter. The need to dilute the milk serum would inevitably involve an increase both in the dimensions and in the retail price of the purifying installation.

The second problem concerns the growth of the microorganisms which necessitates the addition to the milk serum of often large quantities of organic or mineral compounds, for example nitrates, which again increases the cost of purification. It is for this reason that economical considerations have always resulted in the rejection of the concept of microbiologically purifying milk serum.

SUMMARY OF THE INVENTION

We have now found that certain strains of bacteria grow on undiluted milk serum without any need to add organic or mineral compounds, eliminating in some cases more than 80% of the dry solids from the milk serum which itself is consumed by the bacteria or degraded into $CO_2$ $H_2O$. The bacteria to be used in the purification process according to the invention are non-pathogenic aerobic strains having at least one proteolytic enzyme and a $\beta$-galactosidase or lactose-oxidase.

In particular, proteolytic strains of the Enterobacter type and of the Serratia type belonging to the family of Enterobacteriaceae, give excellent results: this is the case with the strains Enterobacter liquefaciens strains BCL and 671, and Serratia atypique 3470 (the strains quoted are part of the Pasteur Institute collection). The strains BCL and 671 were deposited in the Pasteur Institute collection under No.1003 and 1002 respectively.

These strains are particularly interesting because they have a sufficiently rapid metabolism to carry out the operation in reasonable times, do not produce any compounds that are toxic to the flora and fauna of watercourses and are sufficiently well suited to growth in milk serum to avoid contamination by other possibly toxic bacterial species.

In addition, the aerobism of these bacteria prevents excessive acidification of the milk serum.

Purification of the milk serum is carried out in fermentation apparatus known per se for example in the form of tanks or fermenters. The milk serum is given a massive inoculation of bacteria and is stored under effective aeration for 48 hours at a temperature of from 20° to 37°C and preferably at a temperature of around 30°C. In certain cases, the pH-value has to be checked and, if necessary, adjusted to a value between pH 6 and 7 by the addition of a base to maintain the activity of the bacteria.

Under these conditions, a supernatant phase with a very low dry solids content, in many cases less than 20% of the initial content, is obtained after centrifuging to eliminate the bacterial matter.

The bacterial matter recovered, which is rich in protein, can be used for feeding animals which further reduces the cost of purification.

Part of the culture (about 10%) should be retained an inoculum for the following purification cycle.

For an average dairy farm, it is necessary to provide a container with a fermentation capacity of approximately 60 m³ which is suitable for storing the milk serum produced for a period of 48 hours, and does not represent a very large installation.

DESCRIPTION OF PREFERRED EMBODIMENTS

The invention is illustrated by but not limited by the following Examples.

EXAMPLE 1

Purification with the strain BCL Enterobacter liquefaciens.

The culture medium is formed by a sterile milk serum obtained as follows:

Commercial-grade pasteurised milk (LACTEL) incubated at 37°C was treated with commercial-grade rennet (3 ml per liter) incubated for 1 hour at 37°C and then filtered through absorbent gauze. The filtrate was centrifuged (9000 r.p.m. for 15 minutes). The supernatant phase was refiltered on a Buchner filter in the presence of "Hyflo supercell."

Sterilisation was obtained by filtration on a nitrocellulose filter (Millipore).

The concentration of bacteria in the cultures is determined by measuring optical density at 600 nanometres, the correlation between optical density and dry weight having been determined experimentally.

The dry extract content of the milk serum and of the bacterial supernatant phases is measured by drying from 1 to 5 ml of the fluids at 120°C in a platinum dish until they are constant in weight.

The reducing sugar content is determined by Nelson's method (Nelson, Journal of Biological Chemistry, Vol. 152, page 377 (1944). According to this method the lactose is determined at the same time as any other reducing sugar that may be present, such as glucose and galactose, which may have been produced during hydrolysis of the lactose by the bacteria (lactose is in effect a disaccharide consisting of glucose and galactose).

The protein content of the milk serum cannot be directly determined by the biuret method due to the presence of materials which form a precipitate with the reactants. 1 to 5 ml of milk serum are precipitated with trichloracetic acid. The precipitate is washed once with 5% trichloroacetic acid and determined by the biuret method.

10 ml of milk serum are inoculated with a colony of Enterobacter liquefaciens, BCL strain. The culture is placed in a sterile, 100 ml Erlenmeyer flask and stirred at 30°C. Samples are taken. The concentration of bacterial matter is determined, after which the bacteria are eliminated by centrifuging and the supernatant phases subjected to analysis.

| Duration of growth | Bacterial dry weight mg/ml | Percentage of reducing sugar eliminated |
|---|---|---|
| 5 h | 1.73 | — |
| 8 h | 3.15 | — |
| 24 h | 6.6 | 48% |
| 48 h | 4.7 | 80% |

EXAMPLE 2

This Example demonstrates the use of reducing sugar by four different bacterial strains. The culture conditions are the same as in Example 1 and the measurements taken after 42 hours.

| Strains | Percentage of reducing sugar eliminated | Dry extract of the supernatant phase |
|---|---|---|
| Enterobacter liquefaciens (strain BCL) | 76% | — |
| Enterobacter liquefaciens (strain 671) | 86% | 1.3 g/100 ml |
| Enterobacter cloacae | 57% | — |
| Serratia atypique 3470 | 69% | — |

This milk serum had a particularly high lactose content (5.4 g/100 ml). The dry extract of milk serum amounted to 6.1 g/100 ml.

EXAMPLE 3

This, and the following Example, show results obtained with the 671 strain of Enterobacter liquefaciens.

30 ml of sterile undiluted milk serum were inoculated with 2 ml of a saturated culture of the 671 strain in milk serum. The culture was incubated with agitation in an Erlenmeyer flask at a temperature of 30°C.

| Duration of growth | Bacterial dry weight mg/ml | Percentage of protein eliminated | Percentage of reducing sugar eliminated | Dry extract of the supernatant phase g/100 ml |
|---|---|---|---|---|
| 24 h | 7 | 48% | 61% | 3.3 |
| 46 h | 7.5 | 70% | 86% | 1.5 |

The milk serum used had a dry extract of 5.8 g/100 ml and contained 0.36 g/100 ml of protein and 5.2 g/100 ml of lactose.

EXAMPLE 4

The milk serum used in this Example is crude milk serum obtained simply by filtering milk treated with rennet through absorbent gauze. 6 litres of this milk serum were inoculated with 600 ml of saturated culture of the 671 strain. Culture was carried out at 30°C in a well ventilated 10 litre capacity New Brunswick fermenter while stirring at 400 r.p.m. A silicone-based antifoam agent was added during culture.

| Duration of growth | Bacterial dry weight | Percentage of reducing sugar eliminated |
|---|---|---|
| 10 h | 6.9 | 14% |
| 20 h | 9 | 27% |
| 26 h | 9.5 | 52% |
| 30 h | 11 | 57% |
| 43 h | 12 | 88% |

In this culture, acidification was negligible, the final pH-value being 6.2.

The preceding Examples relate to the purification of neutral milk serum obtained by the action of rennet, although the invention also relates to the purification of acid milk serum obtained by the action of lactic ferments (emanating for example from the production of cream cheeses). In this case, the milk serum is neutralised before inoculation, preferably by the addition of ammonia.

The following Example relates to the purification of an acid milk serum.

EXAMPLE 5

10 liters of acid milk serum are adjusted from PH 5 to pH 7 by the addition of 70 ml of 14 N ammonia. This milk serum is inoculated with 1 litre of a saturated culture of Enterobacter liquefaciens strain 671. Culture is carried as in Example 4 above. After 12 hours' incubation, the culture contains 13 g/l of dry bacterial solids, 92% of the reducing sugar having been consumed.

Due to the addition of ammonia, acting as a nitrogen source, 90% of the proteins in the milk serum are still present at the end of culture. It can be seen that in this case purification is much quicker: of the order of 12 hours.

As can be seen from Examples 1 to 4, most of the lactose and of the lactalbumin have disappeared after 48 hours. However, it could be pointed out that the bacterial growth generally stops after 24 hours when only 50% of the lactose has been consumed, although both the lactose and the lactalbumin continue to decompose, a phenomenon which enables the milk serum to decompose without previous dilution.

Accordingly, the invention enables milk serum to be very satisfactorily purified by means of a simple, compact apparatus, the cost of the operation being very low because the by-product obtained (bacterial matter) can be marketed with a view to use in animal feeds.

By way of illustration, the bacterial mass obtained in Example 5 contains approximately 50% of protein whose acid amine composition is as follows:

| acid amine | percentage |
| --- | --- |
| lysine | 7.3 |
| histidine | 1.4 |
| arginine | 4.5 |
| cysteine | 1.31 |
| aspartic + asparagic acid | 11.92 |
| threonine | 5.57 |
| serine | 5.3 |
| glutamic acid + glutamine | 12.6 |
| proline | 5.51 |
| glycine | 6.69 |
| alanine | 9.53 |
| valine | 5.69 |

| acid amine | -continued percentage |
| --- | --- |
| methionine | 3.05 |
| isoleucine | 3.95 |
| leucine | 9.48 |
| tyrosine | 2.19 |
| phenylalanine | 2.68 |

The above Table gives the percentage of molecules of each of the acid amines in the hydrolysate of bacterial matter.

Samples of a culture emanating from inoculation of the acid milk serum of Example 5 were concentrated about 5 times in vacuo and heated on a water bath for 20 minutes to 100°C. The suspension obtained was orally administered to rats and mice without any signs of acute toxicity.

What is claimed is:

1. A process for purifying dairy effluents, comprising fermenting the effluents with at least one non-pathogenic, aerobic, proteolytic bacterial strain of the family Enterobacteriaceae having a least one B-galactosidase or one lactose-oxidase in a container at a temperature of from about 20°–37°C, and separating the bacterial matter from the fermentation liquors.

2. A process for purifying dairy effluents comprising fermenting the effluents with a bacterial strain selected from the group consisting of Enterobacter liquefaciens strain 671 and Serratia atypique 3470 in a container at a temperature of from about 20°–37°C, and separating the bacterial matter from the fermentation liquors.

3. A process according to claim 2 in which the effluents are fermented without dilution.

4. A process according to claim 2 in which the strain used when it is inoculated into an undiluted milk serum increases the optical density of the serum measured at 600nm for at least 24 hours.

5. A process according to claim 2 in which the pH-value of the solution is kept between 6 and 7 during fermentation by the addition of a base.

6. A process according to claim 2 in which the temperature is kept between 25° and 30°C.

7. A process according to claim 2 in which the milk serum treated is an acid milk serum which is neutralized before fermentation by the addition of ammonia.

* * * * *